United States Patent
Cho et al.

(10) Patent No.: US 12,147,771 B2
(45) Date of Patent: Nov. 19, 2024

(54) TOPICAL VECTOR-QUANTIZED VARIATIONAL AUTOENCODERS FOR EXTRACTIVE SUMMARIZATION OF VIDEO TRANSCRIPTS

(71) Applicant: ADOBE INC., San Jose, CA (US)

(72) Inventors: Sangwoo Cho, Sammamish, WA (US); Franck Dernoncourt, San Jose, CA (US); Timothy Jeewun Ganter, Woodinville, WA (US); Trung Huu Bui, San Jose, CA (US); Nedim Lipka, Campbell, CA (US); Varun Manjunatha, Newton, MA (US); Walter Chang, San Jose, CA (US); Hailin Jin, San Jose, CA (US); Jonathan Brandt, Santa Cruz, CA (US)

(73) Assignee: ADOBE INC., San Jose, CA (US)

( * ) Notice: Subject to any disclaimer, the term of this patent is extended or adjusted under 35 U.S.C. 154(b) by 464 days.

(21) Appl. No.: 17/361,878

(22) Filed: Jun. 29, 2021

(65) Prior Publication Data

US 2022/0414338 A1    Dec. 29, 2022

(51) Int. Cl.
*G06F 40/35*      (2020.01)
*G06F 40/279*     (2020.01)

(52) U.S. Cl.
CPC ............ *G06F 40/35* (2020.01); *G06F 40/279* (2020.01)

(58) Field of Classification Search
CPC ......... G06F 40/00; G06F 40/35; G06F 40/279
See application file for complete search history.

(56) References Cited

U.S. PATENT DOCUMENTS

| 9,928,236 B2* | 3/2018 | Dixon ..................... G06F 40/44 |
| 2020/0125575 A1* | 4/2020 | Ghoshal ................ G06F 3/0482 |
| 2020/0167391 A1* | 5/2020 | Zheng ................. G06F 16/3347 |

(Continued)

OTHER PUBLICATIONS

Kong, Sheng-Yi, and Lin-shan Lee. "Improved spoken document summarization using probabilistic latent semantic analysis (plsa)." 2006 IEEE International Conference on Acoustics Speech and Signal Processing Proceedings. vol. 1. IEEE, 2006. (Year: 2006).*

(Continued)

*Primary Examiner* — Daniel C Washburn
*Assistant Examiner* — Sean E Serraguard
(74) *Attorney, Agent, or Firm* — F. CHAU & ASSOCIATES, LLC

(57) ABSTRACT

System and methods for a text summarization system are described. In one example, a text summarization system receives an input utterance and determines whether the utterance should be included in a summary of the text. The text summarization system includes an embedding network, a convolution network, an encoding component, and a summary component. The embedding network generates a semantic embedding of an utterance. The convolution network generates a plurality of feature vectors based on the semantic embedding. The encoding component identifies a plurality of latent codes respectively corresponding to the plurality of feature vectors. The summary component identifies a prominent code among the latent codes and to select the utterance as a summary utterance based on the prominent code.

20 Claims, 7 Drawing Sheets

(56) References Cited

U.S. PATENT DOCUMENTS

| | | | |
|---|---|---|---|
| 2020/0226475 A1* | 7/2020 | Ma | G06N 3/047 |
| 2020/0342016 A1* | 10/2020 | Morris | G06F 40/295 |
| 2020/0372066 A1* | 11/2020 | Saggi | G06F 16/739 |
| 2020/0372225 A1* | 11/2020 | Xu | G06F 40/211 |
| 2021/0117617 A1* | 4/2021 | Blaya | G06F 40/253 |
| 2022/0012425 A1* | 1/2022 | Li | G06F 40/284 |
| 2022/0164705 A1* | 5/2022 | Song | G06N 3/082 |
| 2022/0215052 A1* | 7/2022 | Chalana | G06N 3/045 |

OTHER PUBLICATIONS

Tjandra, Andros, Berrak Sisman, Mingyang Zhang, Sakriani Sakti, Haizhou Li, and Satoshi Nakamura. "VQVAE unsupervised unit discovery and multi-scale code2spec inverter for zerospeech challenge 2019." arXiv preprint arXiv:1905.11449 (2019). (Year: 2019).*

Xiao, et al., "Extractive Summarization of Long Documents by Combining Global and Local Context", In Proceedings of the 2019 Conference on Empirical Methods in Natural Language Processing and the 9th International Joint Conference on Natural Language Processing (EMNLP-IJCNLP), pp. 3011-3021, Hong Kong, China, Association for Computational Linguistics, arXiv:1909.08089v1 [cs.CL] Sep. 17, 2019.

Xu, et al., "Neural Extractive Text Summarization with Syntactic Compression", In Proceedings of the 2019 Conference on Empirical Methods in Natural Language Processing and the 9th International Joint Conference on Natural Language Processing (EMNLP-IJCNLP), pp. 3292-3303, Hong Kong, China, Association for Computational Linguistics, arXiv:1902.00863v2 [cs.CL] Sep. 9, 2019.

Yasunaga, et al., "Graph-based Neural Multi-Document Summarization", In Proceedings of the 21st Conference on Computational Natural Language Learning (CoNLL 2017), pp. 452-462, Vancouver, Canada, Association for Computational Linguistics, arXiv:1706.06681v3 [cs.CL] Aug. 23, 2017.

Zhang, et al., "Neural Latent Extractive Document Summarization", In Proceedings of the 2018 Conference on Empirical Methods in Natural Language Processing, pp. 779-784, Brussels, Belgium, Association for Computational Linguistics, arXiv:1808.07187v2 [cs.CL] Aug. 28, 2018.

Zhao, et al., "Transformer-XH: Multi-Evidence Reasoning With Extra Hop Attention", In International Conference on Learning Representations, 2020, 16 pages.

Zhu, et al., "A Hierarchical Network for Abstractive Meeting Summarization with Cross-Domain Pretraining", In Findings of the Association for Computational Linguistics: EMNLP 2020, pp. 194-203, Online. Association for Computational Linguistics, arXiv:2004.02016v4 [cs.CL] Sep. 20, 2020.

Zhu, et al., "MSMO: Multimodal Summarization with Multimodal Output", In Proceedings of the 2018 Conference on Empirical Methods in Natural Language Processing, pp. 4154-4164, Brussels, Belgium, Association for Computational Linguistics.

Amplayo, et al., "Unsupervised Opinion Summarization with Noising and Denoising", In Proceedings of the 58th Annual Meeting of the Association for Computational Linguistics, pp. 1934-1945, Online. Association for Computational Linguistics, arXiv:2004.10150v1 [cs.CL] Apr. 21, 2020.

Angelidis, et al., "Extractive Opinion Summarization in Quantized Transformer Spaces", Transactions of the Association for Computational Linguistics, vol. 9, pp. 277-293.

Artstein, et al., "Survey Article: Inter-Coder Agreement for Computational Linguistics", Computational Linguistics, 34 (4):555-596, 2008.

Beltagy, et al., "Longformer: The Long-Document Transformer", arXiv:2004.05150v2 [cs.CL] Dec. 2, 2020, 17 pages.

Bražinskas, et al., "Few-Shot Learning for Opinion Summarization", In Proceedings of the 2020 Conference on Empirical Methods in Natural Language Processing (EMNLP), pp. 4119-4135, 2020, Online, Association for Computational Linguistics.

Cao, et al., "Faithful to the Original: Fact-Aware Neural Abstractive Summarization", The Thirty-Second AAAI Conference on Artificial Intelligence (AAAI-18), CoRR, abs/1711.04434, 2017, pp. 4784-4791.

Carletta, et al, "The AMI Meeting Corpus: a Pre-Announcement", In Machine Learning for Multimodal Interaction, pp. 28-39, Berlin, Heidelberg. Springer Berlin Heidelberg, 2005.

Chen, et al., "Fast Abstractive Summarization with Reinforce-Selected Sentence Rewriting", In Proceedings of the 56th Annual Meeting of the Association for Computational Linguistics (vol. 1: Long Papers), pp. 675-686, Melbourne, Australia, Association for Computational Linguistics, arXiv:1805.11080v1 [cs.CL] May 28, 2018.

Clifton, et al., "100,000 Podcasts: A Spoken English Document Corpus", In Proceedings of the 28th International Conference on Computational Linguistics, pp. 5903-5917, Barcelona, Spain (Online), International Committee on Computational Linguistics, 2020.

Cohan, et al., "A Discourse-Aware Attention Model for Abstractive Summarization of Long Documents", In Proceedings of the 2018 Conference of the North American Chapter of the Association for Computational Linguistics: Human Language Technologies, vol. 2 (Short Papers), pp. 615-621, New Orleans, Louisiana, Association for Computational Linguistics, arXiv:1804.05685v2 [cs.CL] May 22, 2018.

Dong, et al., "BANDITSUM: Extractive Summarization as a Contextual Bandit", In Proceedings of the 2018 Conference on Empirical Methods in Natural Language Processing, pp. 3739-3748, Brussels, Belgium, Association for Computational Linguistics, arXiv:1809.09672v3 [cs.CL] May 7, 2019.

Erkan, et al., "LexRank: Graph-based Lexical Centrality as Salience in Text Summarization", Journal of Artificial Intelligence Research 22 (2004), pp. 457-479.

Fabbri, et al., "Multi-News: a Large-Scale Multi-Document Summarization Dataset and Abstractive Hierarchical Model", arXiv:1906.01749v3 [cs.CL] Jun. 19, 2019, 11 pages.

Fan, et al., "Controllable Abstractive Summarization", In Proceedings of the 2nd Workshop on Neural Machine Translation and Generation, pp. 45-54, Melbourne, Australia, Association for Computational Linguistics, arXiv:1711.05217v2 [cs.CL] May 18, 2018.

Gehrmann, et al., "Bottom-Up Abstractive Summarization", In Proceedings of the 2018 Conference on Empirical Methods in Natural Language Processing, pp. 4098-4109, Brussels, Belgium, Association for Computational Linguistics, arXiv:1808.10792v2 [cs.CL] Oct. 9, 2018.

Grenander, et al., "Countering the Effects of Lead Bias in News Summarization via Multi-Stage Training and Auxiliary Losses", In Proceedings of the 2019 Conference on Empirical Methods in Natural Language Processing and the 9th International Joint Conference on Natural Language Processing (EMNLP-IJCNLP), pp. 6019-6024, Hong Kong, China, Association for Computational Linguistics, arXiv:1909.04028v1 [cs.CL] Sep. 8, 2019.

Hernandez, et al., "TED-LIUM 3: Twice as Much Data and Corpus Repartition for Experiments on Speaker Adaptation", Lecture Notes in Computer Science, pp. 198-208, arXiv:1805.04699v4 [cs.CL] Jun. 13, 2019.

Janin, et al., "The ICSI Meeting Corpus", In 2003 IEEE International Conference on Acoustics, Speech, and Signal Processing, 2003, Proceedings, (ICASSP '03), vol. 1, 4 pages.

Jin, et al., "Discrete Latent Variable Representations for Low-Resource Text Classification", In Proceedings of the 58th Annual Meeting of the Association for Computational Linguistics, pp. 4831-4842, Online, Association for Computational Linguistics, arXiv:2006.06226v1 [cs.CL] Jun. 11, 2020.

Kafle et al., "A Corpus for Modeling Word Importance in Spoken Dialogue Transcripts", In Proceedings of the Eleventh International Conference on Language Resources and Evaluation (LREC 2018), Miyazaki, Japan, European Language Resources Association (ELRA), arXiv:1801.09746v3 [cs.CL] Jul. 16, 2019, 6 pages.

Kedzie, et al., "Content Selection in Deep Learning Models of Summarization", In Proceedings of the 2018 Conference on Empirical Methods in Natural Language Processing, pp. 1818-1828, Brussels, Belgium, Association for Computational Linguistics, arXiv:1810.12343v2 [cs.CL] Feb. 18, 2019.

(56) References Cited

OTHER PUBLICATIONS

Kiritchenko, et al., "Capturing Reliable Fine-Grained Sentiment Associations by Crowdsourcing and Best-Worst Scaling", In Proceedings of the 2016 Conference of the North American Chapter of the Association for Computational Linguistics: Human Language Technologies, pp. 811-817, San Diego, California, Association for Computational Linguistics, arXiv:1712.01741v1 [cs.CL] Dec. 5, 2017.

Kryscinski, et al., "Neural Text Summarization: A Critical Evaluation", In Proceedings of the 2019 Conference on Empirical Methods in Natural Language Processing and the 9th International Joint Conference on Natural Language Processing (EMNLP-IJCNLP), pp. 540-551, Hong Kong, China, Association for Computational Linguistics, arXiv:1908.08960v1 [cs.CL] Aug. 23, 2019.

Ladhak, et al., "Exploring Content Selection in Summarization of Novel Chapters", In Proceedings of the 58th Annual Meeting of the Association for Computational Linguistics, pp. 5043-5054, Online, Association for Computational Linguistics, arXiv:2005.018403v3 [cs.CL] Mar. 30, 2021.

Lebanoff, et al., "Analyzing Sentence Fusion in Abstractive Summarization", In Proceedings of the 2nd Work- shop on New Frontiers in Summarization, pp. 104-110, Hong Kong, China, Association for Computational Linguistics, arXiv:1910.00203v1 [cs.CL] Oct. 1, 2019.

Lewis, et al., "BART: Denoising Sequence-to-Sequence Pre-training for Natural Language Generation, Translation, and Comprehension", In Proceedings of the 58th Annual Meeting of the Association for Computational Linguistics, pp. 7871-7880, Online, Association for Computational Linguistics, arXiv:1910.13461v1 [cs.CL] Oct. 29, 2019.

Li, et al., "A Surprisingly Effective Fix for Deep Latent Variable Modeling of Text", In Proceedings of the 2019 Conference on Empirical Methods in Natural Language Processing and the 9th International Joint Conference on Natural Language Processing (EMNLP-IJCNLP), pp. 3603-3614, Hong Kong, China, Association for Computational Linguistics, arXiv:1909.00868v1 [cs.LG] Sep. 2, 2019.

Li, et al., "Keep Meeting Summaries on Topic: Abstractive Multi-Modal Meeting Summarization", In Proceedings of the 57th Annual Meeting of the Association for Computational Linguistics, 2019b, pp. 2190-2196, Florence, Italy, Association for Computational Linguistics.

Li, et al., "VMSMO: Learning to Generate Multimodal Summary for Video-based News Articles", In Proceedings of the 2020 Conference on Empirical Methods in Natural Language Processing (EMNLP), pp. 9360-9369, Online, Association for Computational Linguistics, arXiv:2010.05406v1 [cs.CL] Oct. 12, 2020.

Lin, "ROUGE: A Package for Automatic Evaluation of Summaries", In Text Summarization Branches Out, 2004, pp. 74-81, Barcelona, Spain, Association for Computational Linguistics.

Liu, et al. "What Are Meeting Summaries? An Analysis of Human Extractive Summaries in Meeting Corpus", In Proceedings of the 9th SIGdial Workshop on Discourse and Dialogue, pp. 80-83, Columbus, Ohio, Association for Computational Linguistics, 2008.

Liu, et al., "Text Summarization with Pretrained Encoders", In Proceedings of the 2019 Conference on Empirical Methods in Natural Language Processing and the 9th International Joint Conference on Natural Language Processing (EMNLP-IJCNLP), pp. 3730-3740, Hong Kong, China, Association for Computational Linguistics, arXiv:1908.08345v2 [cs.CL] Sep. 5, 2019.

Manakul, et al., "Abstractive Spoken Document Summarization using Hierarchical Model with Multi-stage Attention Diversity Optimization", In Proceedings of the 21st Annual Conference of the International Speech Communication Association (INTERSPEECH), 2020, pp. 4248-4252.

Maynez, et al., On Faithfulness and Factuality in Abstractive Summarization, In Proceedings of the 58th Annual Meeting of the Association for Computational Linguistics, pp. 1906-1919, Online, Association for Computational Linguistics, arXiv:2005.00661v1 [cs.CL] May 2, 2020.

Mihalcea, et al., "TextRank: Bringing Order into Texts", In Proceedings of the 2004 Conference on Empirical Methods in Natural Language Processing, pp. 404-411, Barcelona, Spain, Association for Computational Linguistics.

Murray, et al., "Summarizing Spoken and Written Conversations", In Proceedings of the 2008 Conference on Empirical Methods in Natural Language Processing, pp. 773-782, Honolulu, Hawaii, Association for Computational Linguistics.

Narayan, et al., "Ranking Sentences for Extractive Summarization with Reinforcement Learning", In Proceedings of the 2018 Conference of the North American Chapter of the Association for Computational Linguistics: Human Language Technologies, vol. 1 (Long Papers), pp. 1747-1759, New Orleans, Louisiana, Association for Computational Linguistics, arXiv:1802.08636v2 [cs.CL] Apr. 16, 2018.

Oord, et al., "Neural Discrete Representation Learning", In Advances in Neural Information Processing Systems. vol. 30, pp. 6306-6315, Curran Associates, Inc., arXiv:1711.00937v2 [cs.LG] May 30, 2018.

Palaskar, et al., "Multimodal Abstractive Summarization for How2 Videos", In Proceedings of the 57th Annual Meeting of the Association for Computational Linguistics, pp. 6587-6596, Florence, Italy, Association for Computational Linguistics, arXiv:1906.07901v1 [cs.CL] Jun. 19, 2019.

Papalampidi, et al., "Screenplay Summarization Using Latent Narrative Structure", In Proceedings of the 58th Annual Meeting of the Association for Computational Linguistics, pp. 1920-1933, Online, Association for Computational Linguistics, arXiv:2004.12727v1 [cs.CL] Apr. 27, 2020.

Penn, et al., "A Critical Reassessment of Evaluation Baselines for Speech Summarization", In Proceedings of ACL-08: HLT, pp. 470-478, 2008, Columbus, Ohio, Association for Computational Linguistics.

Raffel, et al., "Exploring the Limits of Transfer Learning with a Unified Text-to-Text Transformer", Journal of Machine Learning Research, 21 (2020):1-67.

See, et al., "Get to the Point: Summarization with Pointer-Generator Networks", In Proceedings of the 55th Annual Meeting of the Association for Computational Linguistics (vol. 1: Long Papers), pp. 1073-1083, Vancouver, Canada, Association for Computational Linguistics, arXiv:1704.04368v2 [cs.CL] Apr. 25, 2017.

Shang, et al., "Unsupervised Abstractive Meeting Summarization with Multi-Sentence Compression and Budgeted Submodular Maximization", In Proceedings of the 56th Annual Meeting of the Association for Computational Linguistics (vol. 1: Long Papers), pp. 664-674, Melbourne, Australia, Association for Computational Linguistics, arXiv:1805.05271v2 [cs.CL] Nov. 14, 2018.

Tan, et al., "Abstractive Document Summarization with a Graph-Based Attentional Neural Model", In Proceedings of the 55th Annual Meeting of the Association for Computational Linguistics (vol. 1: Long Papers), pp. 1171-1181, Vancouver, Canada, Association for Computational Linguistics.

Vanderwende, et al., "Beyond SumBasic: Task-focused summarization with sentence simplification and lexical expansion", Information Processing and Management, 43(2007):1606-1618.

Wang, et al., Heterogeneous Graph Neural Networks for Extractive Document Summarization, In Proceedings of the 58th Annual Meeting of the Association for Computational Linguistics, pp. 6209-6219, Online, Association for Computational Linguistics, arXiv:2004.12393v1 [cs.CL] Apr. 26, 2020.

Wang, et al., "A Pilot Study of Opinion Summarization in Conversations", In Proceedings of the 49th Annual Meeting of the Association for Computational Linguistics: Human Language Technologies, pp. 331-339, 2011, Portland, Oregon, USA, Association for Computational Linguistics.

Wang, et al., "Domain-Independent Abstract Generation for Focused Meeting Summarization", In Proceedings of the 51st Annual Meeting of the Association for Computational Linguistics (vol. 1: Long Papers), 2013, pp. 1395-1405, Sofia, Bulgaria, Association for Computational Linguistics,.

Wolf, et al., "Transformers: State-of-the-Art Natural Language Processing", In Proceedings of the 2020 Conference on Empirical

(56) References Cited

OTHER PUBLICATIONS

Methods in Natural Language Processing: System Demonstrations, pp. 38-45, Online, Association for Computational Linguistics.

* cited by examiner

TOPICAL VECTOR-QUANTIZED VARIATIONAL AUTOENCODERS FOR EXTRACTIVE SUMMARIZATION OF VIDEO TRANSCRIPTS

BACKGROUND

The following relates generally to natural language processing, and more specifically to text summarization.

Natural language processing (NLP) refers to techniques for using computers to generate or interpret natural language. In some cases, NLP tasks involve assigning annotation data such as grammatical information to words or phrases within a natural language expression. Different classes of machine-learning algorithms have been applied to NLP tasks. Some algorithms, such as decision trees, utilize hard if-then rules. Other systems use neural networks or statistical models which make soft, probabilistic decisions based on attaching real-valued weights to input features. The models can express the relative probability of multiple answers.

Text summarization refers to producing a concise summary of text (such as text from a document or from an audio or video clip). In some cases, text summarization of a clip takes into account information representing context of a clip. For example, transcripts may be obtained from channels such as movies, meetings, speeches, podcasts, etc. The summary helps users to understand content of the channel without reading, listening to, or viewing the entire content.

However, conventional summarization techniques are not sufficiently fast or reliable to generate text summaries for text generated in real time, such as livestream transcripts of spoken text. Therefore, there is a need in the art for systems and methods to produce fast and reliable text summaries for recorded videos and livestream transcripts.

SUMMARY

The present disclosure describes systems and methods for text summarization. Some embodiments of the present disclosure include a neural network that receives video, audio, or text as input and outputs a text summary. The text summarization system of the present disclosure may recognize an audio portion of a livestreaming event, convert the audio to text, and produce a high-level summarization for faster understanding of a video event.

A method, apparatus, non-transitory computer readable medium, and system for text summarization are described. One or more embodiments of the method, apparatus, non-transitory computer readable medium, and system include receiving text including an utterance; generating a semantic embedding of the utterance using an embedding network; generating a plurality of feature vectors based on the semantic embedding using a convolution network; identifying a plurality of latent codes respectively corresponding to the plurality of feature vectors by identifying a closest latent code from a codebook to each of the feature vectors; identifying a prominent code among the latent codes; and generating an indication that the utterance is a summary utterance based on the prominent code.

An apparatus, system, and method for text summarization are described. One or more embodiments of the apparatus, system, and method include an embedding network configured to generate a semantic embedding of an utterance, a convolution network generate a plurality of feature vectors based on the semantic embedding, an encoding component configured to identify a plurality of latent codes respectively corresponding to the plurality of feature vectors by identifying a closest latent code from a codebook to each of the feature vectors, and a summary component configured to identify a prominent code among the latent codes and to select the utterance as a summary utterance based on the prominent code.

A method, apparatus, non-transitory computer readable medium, and system for text summarization are described. One or more embodiments of the method, apparatus, non-transitory computer readable medium, and system include receiving a training set including an input utterance, generating a semantic embedding of the input utterance using an embedding network, generating a plurality of feature vectors based on the semantic embedding using a convolution network, identifying a plurality of latent codes respectively corresponding to the plurality of feature vectors by identifying a closest latent code from a codebook to each of the feature vectors, generating an output embedding based on the plurality of latent codes using a convolutional decoder, generating an output text based on the output embedding, computing an autoencoder loss by comparing the input utterance and the output text, and training convolution network based on the autoencoder loss.

DETAILED DESCRIPTION

Figure 1:
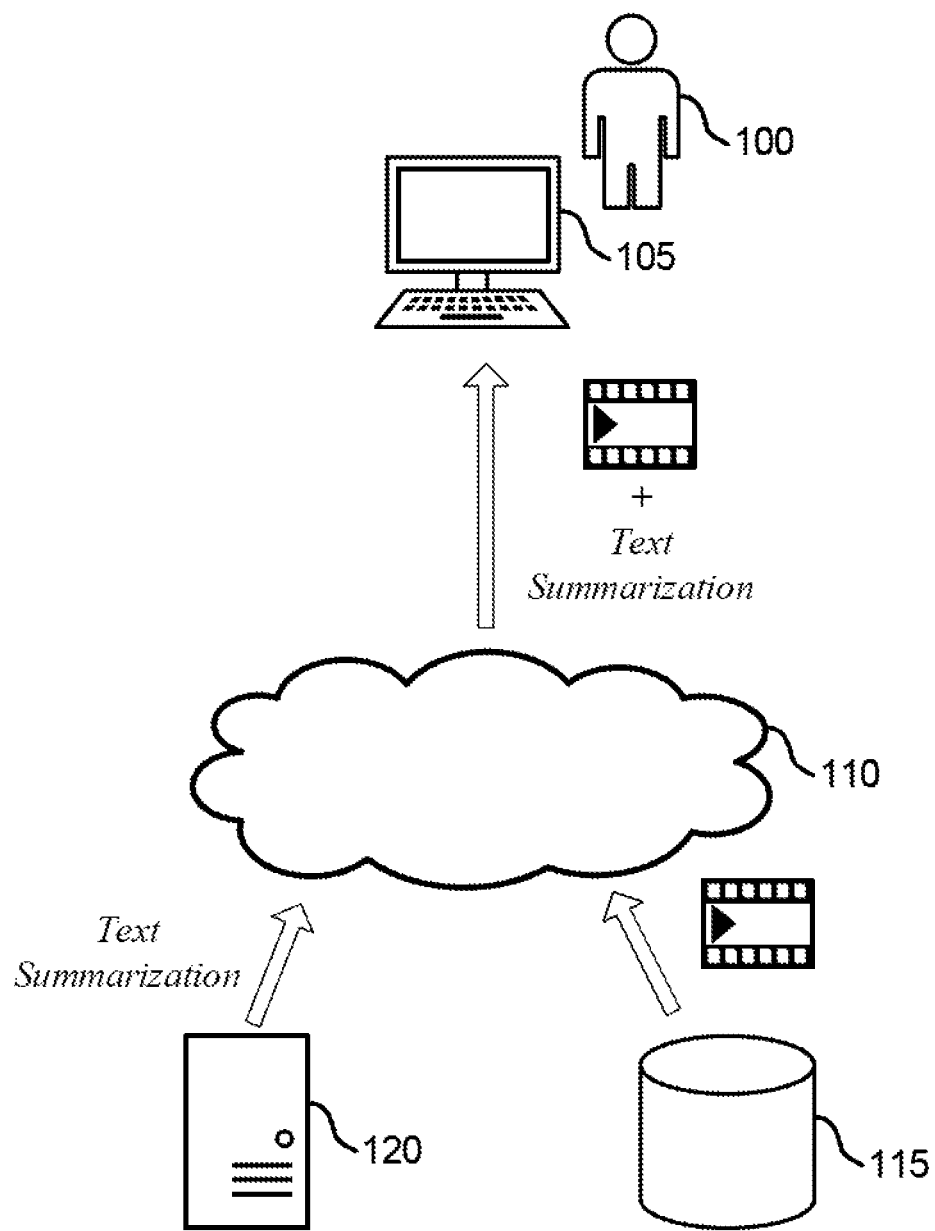
FIG. 1 shows an example of a summarization system according to aspects of the present disclosure.

The present disclosure describes systems and methods for natural language processing (NLP). In some embodiments, a text summarization network receives an input utterance and determines whether the utterance should be included in a summary of the text. For example, text-based preview summaries may be generated for livestream transcripts. According to some embodiments, an unsupervised model is used to learn utterance representations and identify relevant summary-worthy spoken text in a streamed video clip. An annotation interface and a benchmark dataset are created for automatic summarization of livestream transcripts.

NLP systems may be used to generate a summary of written or spoken text. However, existing text summarization systems are incapable of providing fast, accurate summarization of text that does not conform to formal structures, or that includes a high density of irrelevant content. For example, conventional text summarizers may be trained on written text, including news articles, reviews, scientific papers, and book chapters. Applying such summarizers to spoken text with low information density in relevant utterances results in inaccurate summarization. For example, text from video or live-streamed audio may include a large amount of informal, unstructured content that is not relevant to a summarization.

Embodiments of the present disclosure are capable of identifying salient content from text where a substantial number of utterances are devoted to an informal conversation, such as conversation text from a live streamed event where a presenter attempts to connect with the audience. In some embodiments, prominent topics are identified, and only utterances that include a prominent topic are used for summarization.

According to various embodiments, transcripts may be obtained from a variety of channels such as movies, multi-party meetings, telephone speech and podcast, where salient content is scattered throughout the transcript and mixed with substantial text. For example, embodiments of the present disclosure include an interface for automatic summarization of livestreamed videos. Embodiments of the present disclosure generate text previews of streaming videos to help users find relevant information. In some embodiments, a graphical user interface is provided that includes a clip of the video with display of the text summary.

One or more embodiments of the present disclosure utilize unsupervised representation learning techniques for content extraction. Unsupervised representation learning techniques may be easily trained for a specific domain to improve summarization accuracy. According to some embodiments, an unsupervised summarization model based on variational autoencoders is used to identify the summary-worthy utterances of a video to form text summaries. In some cases, the interface includes annotators to specify the salient utterances (e.g., for use in generating training data).

Embodiments of the present disclosure may be used in the context of text summarization. For example, a text summarization system based on the present disclosure may receive a streaming video or audio file as input, and may output a summary of the text in the file. An example of an application of the inventive concept in the text summarization context is described with reference to FIGS. 1 and 2. Details regarding the architecture of an example text summarization system are described with reference to FIGS. 3 and 4. A description of an example text summarization process is described with reference to FIG. 5. A description of an example training process is described with reference to FIGS. 6 and 7.

Video Summarization System

FIG. 1 shows an example of a summarization system according to aspects of the present disclosure. The example shown includes user 100, user interface 105, summarization apparatus 110, database 115, and cloud 120. User 100 is an example of, or includes aspects of, the corresponding element described with reference to FIG. 2.

In the example of FIG. 1, a database 115 may store a video file. In some cases, the summarization apparatus 110 may communicate with the database 120 via the cloud 120 to download or stream the video file. The video file may be input to the summarization apparatus 110, which produces a summary of the text in the video based on utterances. The summarization is provided to the user 100 via the cloud 120 and user interface 105. In some cases, the summary is provided to the user 100 without a cloud 120, or bypasses the cloud 120.

A user interface 105 may be a computing device that enables a user 100 to interact with information including information stored on the cloud. In some embodiments, the user interface 105 may include an audio device, such as an external speaker system, an external display device such as a display screen, or an input device (e.g., remote control device interfaced with the user interface 105 directly or through an IO controller module). In some cases, a user interface 105 may be a graphical user interface 105 (GUI).

According to some embodiments, user interface 105 receives text including an utterance and displays the summary utterance.

Summarization apparatus 110 is an example of, or includes aspects of, the corresponding element described with reference to FIG. 3. The summarization apparatus generates a semantic embedding of an utterance, generates feature vectors based on the semantic embedding, identifies latent codes respectively corresponding to the plurality of feature vectors by identifying a closest latent code from a codebook to each of the feature vectors, and identifies a prominent code among the latent codes and to select the utterance as a summary utterance based on the prominent code. An audio converter may be used to receive audio information and convert the audio information to text, wherein the utterance is identified from the text.

A database 115 is an organized collection of data. For example, a database 115 stores audio or video data in a specified format known as a schema. The audio or video data may be downloaded or streamed to users. A database 115 may be structured as a single database 115, a distributed database 115, multiple distributed databases 115, or an emergency backup database 115. In some cases, a database 115 controller may manage data storage and processing in a database 115. In some cases, a user 100 interacts with database 115 controller. In other cases, database 115 controller may operate automatically without user 100 interaction.

The database 115 may communicate with the user 100 via the cloud 120 and user interface 105. For example, the user 100 may retrieve an audio or a video file from the database 115 and the database 115 may transmit the file to the user 100 via the cloud 120 and user interface 105. Additionally or alternatively, the streaming video or video file may be store on the user interface 105 or the streaming video or video file may be retrieved directly from the database, bypassing the cloud 120.

A cloud 120 is a computer network configured to include on-demand availability of computer system resources, such as data storage and computing power. In some examples, the cloud 120 includes resources without active management by the user 100. The term cloud 120 is sometimes used to describe data centers available to many users 100 over the Internet. Some large cloud 120 networks have functions distributed over multiple locations from central servers. A server is designated an edge server if it has a direct or close connection to a user 100. In some cases, a cloud 120 is limited to a single organization. In other examples, the cloud 120 is available to many organizations. In one example, a cloud 120 includes a multi-layer communications network comprising multiple edge routers and core routers. In another example, a cloud 120 is based on a local collection of switches in a single physical location.

Figure 2:
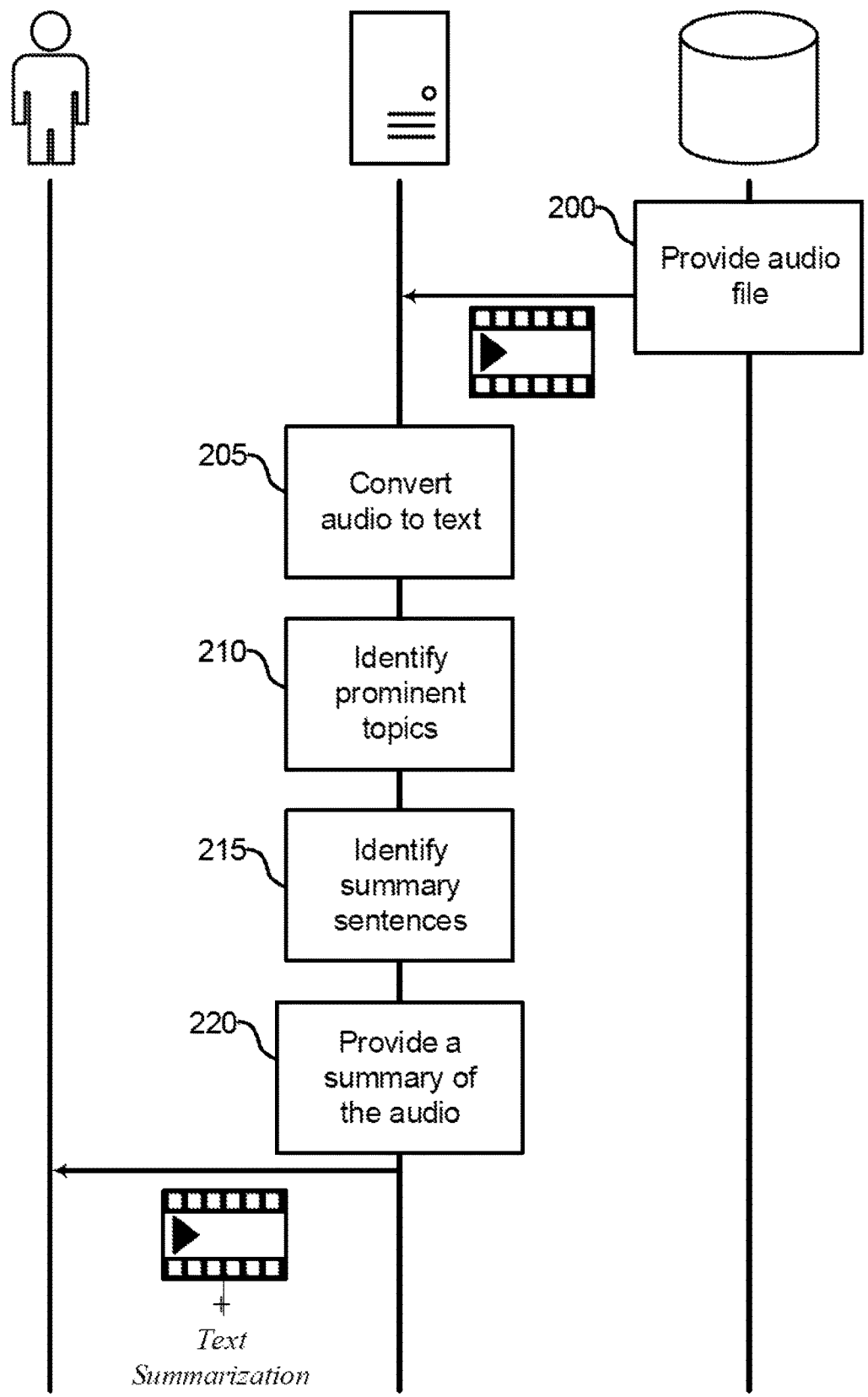
FIG. 2 shows an example of a process for text summarization according to aspects of the present disclosure.

FIG. 2 shows an example of a process for text summarization according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Livestreaming is a promising modern communication medium. Livestreaming video platforms encompass a variety of topics (i.e., video games, social media, professional sports, etc.). Livestreams are distinguished by the characteristics, for example, excessive length, verbal communication and informal nature. The length of the recordings can last from several minutes to several hours. In case of verbal communication, natural language is used as the primary means of communication, for example, in contrast to gestures or facial expressions. Additionally, the streamer language is informal and unplanned in multiple cases, unlike news broadcasts. Livestreaming platforms may not satisfy user information needs without an effective mechanism to summarize streamed content.

One or more embodiments of the present disclosure create a text preview of the recorded content. For example, when users hover over the thumbnail or scroll past a video, a preview of the content is presented. A corpus of more than 500 hours of video, which were livestreamed on a social media platform is used to showcase and discover creative work. In some examples, livestreams are shown, where the artists showcase the use of photo editing software in designing holiday cards, posters, logos and more. Video analysis is not suitable in such cases, as the video mirrors the screen content of the artist. One or more embodiments identify salient spoken text (i.e., utterances) to produce an extract of the livestream transcript for the automatic creation of a text preview.

One or more embodiments of the present disclosure include a model based on a variational autoencoder (e.g., vector-quantized variational autoencoders (VQ-VAE)) to identify salient utterances. The text summarization model of the present disclosure learns in-domain utterance representations through reconstruction, which may be used for the adaptation of general-domain models. Sequential methods may not be used for utterance selection for live-streaming content due to scaling up, reduced flexibility and large transcripts that exceed a maximum length.

In some cases, it can be expensive and time consuming to obtain annotated data and detailed guidelines for reliable annotation of livestream transcripts. Therefore, one or more embodiments of the present disclosure include a graphical user interface for summary annotation that includes a clip of the livestream recording with a synchronized display of the transcript to the annotators. The interface includes annotators to specify summary-worthy utterances and write a concise summary.

Embodiments of the present disclosure create a detailed annotation interface and new benchmark dataset for automatic summarization of livestream transcripts. One or more embodiments include an unsupervised model based on a variational autoencoder (e.g., VQ-VAE) to identify salient utterances from livestream transcripts to form preview summaries. An embodiment of a text summarization model is evaluated across multiple dimensions and achieves improved performance in comparison to existing summarization systems. Additionally or alternatively, embodiments of the present disclosure evaluate summaries generated for livestream transcripts. Thus, embodiments of the disclosure provide improved data annotation and summarization technologies for transcripts.

At operation 200, an audio or video file is sent to the text summarization system. The file may be sent by either a user or from a database and may be downloaded in its entirety or live streamed. If a video file is received, it may be converted to an audio file.

At operation 205, the system converts audio to text. The audio and text may be in any natural language. In some cases, the operations of this step refer to, or may be performed by, an audio converter as described with reference to FIG. 3. For example, the audio to text conversion using acoustic modeling and language modeling such as by using a hidden Markov model (HMM), a dynamic time warping (DTW) model, or an artificial neural network (ANN), For example, a sequence of vectors obtained by taking a Fourier transform of a time window. Different words can be identified based on the output distribution using an HMM, DTW, or ANN.

At operation 210, the system identifies prominent topics. Identifying prominent topics may include identifying one or more prominent codes. For example, topics can be identified and encoded can be identified by using the method outline in FIG. 4 (steps 400 through 410) and FIG. 7 in elements 700 through 710. The, prominent codes can be identified based on the frequency of codes in a document or set of utterances. For example, those topics with a frequency above a predetermined threshold can be identified as prominent codes. Alternatively, a set percentage or ratio of codes can be identified as prominent codes.

A prominent code enables effective identification of summary utterances without biasing towards the lengthy ones. In one embodiment, prominent codes are found using grid search on prominent latent codes and the associated utterances. A score is assigned to utterance that computes the frequency of association with prominent code.

In some cases, the operations of this step refer to, or may be performed by, a text summarization apparatus as described with reference to FIG. 1, using an embedding network 320 to generate a semantic embedding, a convolution network 325 to generate feature vectors, and encoding component 330 to generate an encoding of each utterance as described in FIG. 3. The components and functions of the text summarization apparatus are also described in FIG. 4, and the method of generating the encoding for each utterance is described with reference to steps 505, 510 and 515 of

FIG. 5.

At operation 215, the system identifies summary sentences. In some cases, the summary sentence may be a summary utterance. In some embodiment, the system uses an unsupervised summarizer model that implements vector-quantized variational autoencoders to learn utterance representations and identify summary utterances. Summary utterances are defined as associated with prominent latent codes or topics at test time. Prominent code includes effective identification of summary utterances without biasing towards the lengthy ones. In some cases, the operations of this step refer to, or may be performed by, a text summarization apparatus as described with reference to FIG. 1, for example, using a summary component 335 as described in FIG. 3, or the summary component 415 as described in FIG. 4. The process of identifying the summary sentences is further described with reference to steps 520 and 525 with reference to FIG. 5.

At operation 220, the system provides a summary of the streaming audio to user. For example, summary sentences that are identified with prominent codes can be grouped or concatenated and presented to the user (e.g., by displaying text on a screen) as a summary of the streaming audio. In some cases, the summary may be stored in a database. In some cases, the operations of this step refer to, or may be performed by, a text summarization apparatus as described with reference to FIG. 1.

Architecture

An apparatus, system, and method for text summarization are described. One or more embodiments of the apparatus, system, and method include an embedding network configured to generate a semantic embedding of an utterance, a convolution network generate a plurality of feature vectors based on the semantic embedding, an encoding component configured to identify a plurality of latent codes respectively corresponding to the plurality of feature vectors by identifying a closest latent code from a codebook to each of the feature vectors, and a summary component configured to identify a prominent code among the latent codes and to select the utterance as a summary utterance based on the prominent code.

Some examples of the apparatus, system, and method described above further include an audio converter configured to receive audio information and convert the audio information to text, wherein the utterance is identified from the text. Some examples of the apparatus, system, and method described above further include a user interface configured to display the summary utterance and a summary component configured to generate a summary for a text based on the summary utterance.

Figure 3:
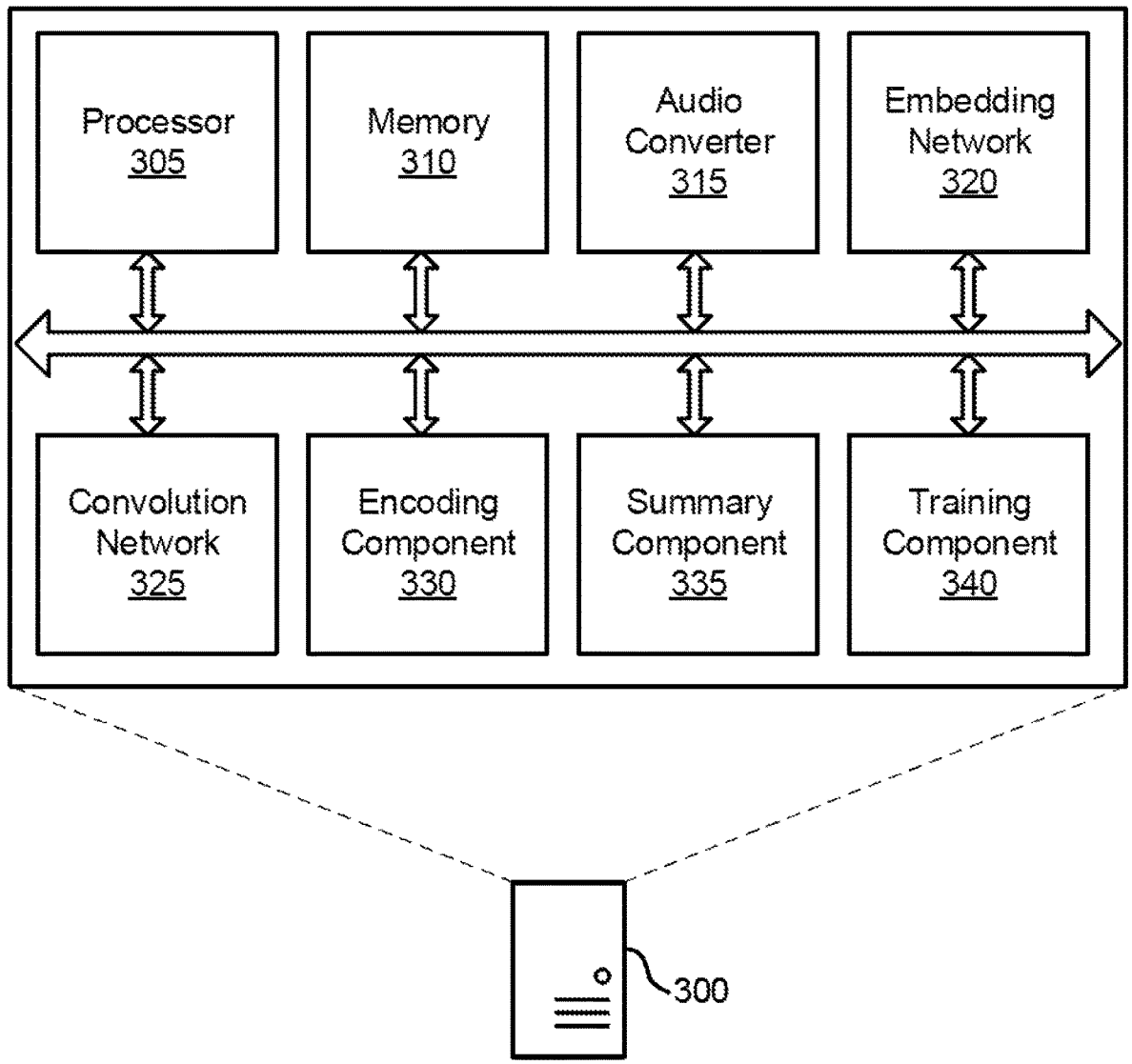
FIG. 3 shows an example of a summarization apparatus according to aspects of the present disclosure.

FIG. 3 shows an example of a summarization apparatus 300 according to aspects of the present disclosure. In one embodiment, summarization apparatus 300 includes processor 305, memory 310, audio converter 315, embedding network 320, convolution network 325, encoding component 330, summary component 335, and training component 340.

Salient spoken text (i.e., utterances) are identified to produce an extract of the livestream transcript for the automatic creation of a text preview. Let $\chi$ denote a sequence of input utterances (i.e., spoken text) from a segment of the transcript. The text summarization apparatus 300 aims to extract a subset of utterances $y \subset \chi$ that convey content of the input. In some examples, an unsupervised text summarization model uses vector-quantized variational autoencoders to learn utterance representations and identifies summary utterances. The text summarization apparatus accounts for domain characteristics of livestreams, which showcase creative work of artists and designers on use of photo editing software.

The text summarization apparatus model learns discrete representations for an utterance using the embedding network 320, convolution network 325, and the encoding component 330. The representations may then be used to categorize the utterance along various dimensions. In an example scenario, a user may utter the phrase "Good morning Hi everybody," suggesting a greeting to start a dialogue. The user may continue with dialogue such as, "I had probably 3 or 4 different customers on YouTube and . . . on Facebook asked me how you burn an audio CD in Adobe Audition." As a result, the greeting and dialogue connects with the audience and introduces the main topic. The method groups utterances based on the discrete representations and selects salient utterances to form a summary. A codebook of latent codes is used to discretize a semantically meaningful space to map an input utterance using an embedding function. Codebook embeddings are used as text summarization model parameters.

The embedding network 320, convolution network 325, encoding component 330, summary component 335, and training component 340 may be implemented either as hardware components or as software stored in the memory 310 and executed on the processor 305. Summarization apparatus 300 is an example of, or includes aspects of, the corresponding element described with reference to FIG. 1.

A processor 305 is an intelligent hardware device, (e.g., a general-purpose processing component, a digital signal processor 305 (DSP), a central processing unit (CPU), a graphics processing unit (GPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 305 is configured to operate a memory 310 array using a memory 310 controller. In other cases, a memory 310 controller is integrated into the processor 305. In some cases, the processor 305 is configured to execute computer-readable instructions stored in a memory 310 to perform various functions. In some embodiments, a processor 305 includes special-purpose components for modem processing, baseband processing, digital signal processing, or transmission processing.

Examples of a memory 310 device include random access memory 310 (RAM), read-only memory 310 (ROM), or a hard disk. Examples of memory 310 devices include solid state memory 310 and a hard disk drive. In some examples, memory 310 is used to store computer-readable, computer-executable software including instructions that, when executed, cause a processor 305 to perform various functions described herein. In some cases, the memory 310 contains, among other things, a basic input/output system (BIOS) which controls basic hardware or software operation such as the interaction with peripheral components or devices. In some cases, a memory 310 controller operates memory 310 cells. For example, the memory 310 controller can include a row decoder, column decoder, or both. In some cases, memory 310 cells within a memory 310 store information in the form of a logical state.

An audio converter 315 is a device or software used to convert audio signals to another format. In some cases, an audio converter 315 may convert digital audio to readable or searchable text. For example, an audio converter 315 may receive, as input, audio from a user. The audio converter 315 may then convert the audio into natural language text and store the text for searching.

According to some embodiments, audio converter 315 receives audio information (e.g., streaming audio or an audio file such as a WAV or MP3 file, but the disclosure is not limited thereto). In some examples, audio converter 315 converts the audio information to produce the text. In some examples, audio converter 315 receives video information (e.g., streaming video or a video file such as a WMV, AVI, MOV or MP4 file, but the disclosure is not limited thereto). In some examples, audio converter 315 identifies the audio information from the video information. According to some embodiments, audio converter 315 is configured to convert the audio information to text, wherein the utterance is identified from the text. Additionally or alternatively, the audio converter 315 receives a training set including an input utterance.

According to some embodiments, embedding network 320 generates a semantic embedding of the utterance or input utterance using an embedding network 320. In some examples, embedding network 320 takes an input in the form of a string of text and appends a sentence tag to the text. In some examples, embedding network 320 updates the codebook during the training. Embedding network 320 is an example of, or includes aspects of, the corresponding element described with reference to FIG. 4, and may operate according to the method described in step 505 of FIG. 5.

In some embodiments, embedding network 320 generates a vector representation for text in a vector space where words that have the same meaning have a similar vector representation. For e example, embedding network 320 may include a BERT model, a GloVe model, a Word2vec model.

Bidirectional Encoder Representations from Transformers (BERT) is a transformer-based machine learning technique for natural language processing (NLP). GloVe is an unsupervised algorithm for training a network using on aggregated global word-word co-occurrence statistics from a corpus. A Word2vec model may include a shallow neural network trained to reconstruct the linguistic context of words. GloVe and Word2vec models may take a large corpus of text and produces a vector space as output. In some cases, the vector space may have a large number of dimensions. Each word in the corpus is assigned a vector in the space. Word vectors are positioned in the vector space in a manner such that similar words are located nearby in the vector space. In some cases, an embedding space may include syntactic or context information in additional to semantic information for individual words.

A convolution network 325 is used with a set of filters to convolve the embedded text. The output may be sequence of feature vectors. According to some embodiments, convolution network 325 generates the set of feature vectors based on the semantic embedding using a convolution network 325. In some examples, a number of the latent codes is equal to a number of dimensions of the semantic embedding. In some examples, a number of dimensions of the latent codes is equal to a number of filters of the convolution network 325. According to some embodiments, convolution network 325 generates a plurality of feature vectors based on the semantic embedding. In some examples, convolution network 325 generates an output embedding based on the set of latent codes using a convolutional decoder. Convolution network 325 is an example of, or includes aspects of, the corresponding element described with reference to FIG. 4, and may operate according to the method described in step 510 of FIG. 5.

According to one or more embodiments of the present disclosure, the convolution network 325 is based on a variational autoencoder (e.g., vector-quantized variational autoencoders (VQ-VAE)). Thus, the text summarization model of the present disclosure learns in-domain utterance representations through reconstruction for the adaptation of general-domain models. In some examples, the input utterance 700 is reconstructed with the latent code embeddings which may be achieved by generating a dense vector using the convolution network 325.

According to some embodiments, encoding component 330 identifies a set of latent codes respectively corresponding to the set of feature vectors by identifying a closest latent code from a codebook to each of the feature vectors. In some examples, encoding component 330 computes a Euclidean distance between each of the feature vectors and each latent code from the codebook, where the closet latent code is identified based on the Euclidean distance. In some examples, encoding component 330 identifies a set of text segments in the text.

In some examples, encoding component 330 generates an output text based on the output embedding. In some examples, encoding component 330 computes an autoencoder loss by comparing the input utterance and the output text. In some examples, encoding component 330 computes a codebook loss by comparing each of the set of feature vectors with a corresponding latent code from the set of latent codes, where the training is further based on the codebook loss. In some examples, the codebook loss is based on a stop-gradient operator on the each of the set of feature vectors, the corresponding latent code, or both.

According to some embodiments, encoding component 330 is configured to identify a plurality of latent codes respectively corresponding to the plurality of feature vectors by identifying a closest latent code from a codebook to each of the feature vectors. Encoding component 330 is an example of, or includes aspects of, the corresponding element described with reference to FIG. 4, and may operate according to the method described in step 515 of FIG. 5.

In some cases, the encoding component 330 discretizes an H-dimensional semantic space to producing a single latent code for each dimension of the semantic space. The input utterance can be reconstructed with the latent code embeddings. Summary utterances are defined as associated with prominent latent codes.

According to some embodiments, summary component 335 identifies a prominent code among the latent codes and selects an utterance as a summary utterance based on the prominent code. The prominent code may be identified from a codebook, which can be selected or trained to represent prominent topics in a document. For example, prominent codes can be selected after encoding each of the utterances in the text by counting the frequency with which each of the codes occurs in the text. The codes tha occur the most can be selected as prominent codes, and utterances that are identified with prominent codes can be selected as summary utterances.

In some examples, the audio information is received in a streaming format, and the utterance is selected as the summary utterance in real time. In some examples, summary component 335 identifies a set of summary utterances for the text and generates a summary for the text based on the set of summary utterances. In some examples, summary component 335 identifies a frequency for each latent code from the codebook in each of the text segments and identifies a set of prominent codes based on the frequency, where the prominent code is an element of the set of prominent codes. In some examples, summary component 335 identifies a most frequent code from each of the text segments, where the set of prominent codes includes the most frequent code from each of the text segments.

According to some embodiments, summary component 335 is configured to identify a prominent code among the latent codes and to select the utterance as a summary utterance based on the prominent code. In some examples, the summary component 335 is further configured to generate a summary for a text based on the summary utterance. Summary component 335 is an example of, or includes aspects of, the corresponding element described with reference to FIG. 4, and may operate according to the method described in steps 520 and 525 of FIG. 5.

According to some embodiments, training component 340 trains convolution network 325 based on the autoencoder loss. In some examples, training component 340 trains embedding network 320 based on the autoencoder loss.

Figure 4:
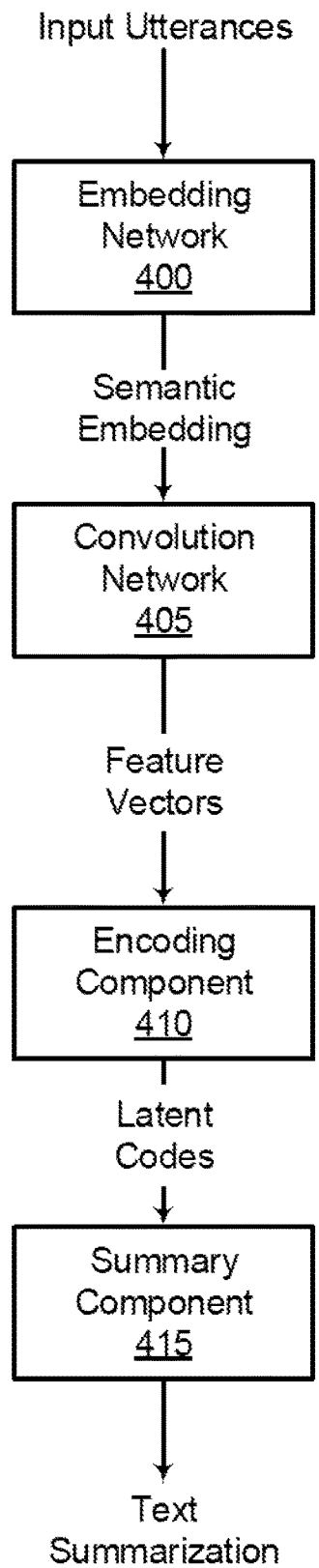
FIG. 4 shows an example of a text summarization diagram according to aspects of the present disclosure.

FIG. 4 shows an example of a text summarization diagram according to aspects of the present disclosure. The example shown includes embedding network 400, convolution network 405, encoding component 410, and summary component 415.

Embedding network 400 receives an utterance. The utterance can be a video converted to text, audio converted to text, or a text document. A semantic embedding of the utterance is generated by the embedding network 400. Embedding network 400 may include a BERT embedder. Embedding network 400 is an example of, or includes aspects of, the corresponding element described with reference to FIG. 3.

The convolution network 405 generates feature vectors based on the semantic embedding using a convolutional encoder. The feature vectors may be sequential and may be input to the encoding component 410. Convolution network 405 is an example of, or includes aspects of, the corresponding element described with reference to FIG. 3.

Encoding component 410 receives the feature vectors and determines associated latent codes via a codebook. The codebook contains predefined codes that can be used for convolution decoding. Encoding component 410 is an example of, or includes aspects of, the corresponding element described with reference to FIG. 3.

Associated latent codes are provided to the convolution network 405 for decoding. In some cases, the input utterance is reconstructed using the latent codes or latent code embeddings, which is a performed by generating a dense vector using the convolution decoder of convolution network 405.

A transformer decoder may be used to reconstruct the input utterance to produce an output text, where code embeddings represent vectors representing topics. Dimension of the semantic space are grouped based on the topic. Summary component 415 may include a transformer decoder. Summary component 415 is an example of, or includes aspects of, the corresponding element described with reference to FIG. 3.

Text Summarization Method

A method, apparatus, non-transitory computer readable medium, and system for text summarization are described. One or more embodiments of the method, apparatus, non-transitory computer readable medium, and system include receiving text including an utterance, generating a semantic embedding of the utterance using an embedding network, generating a plurality of feature vectors based on the semantic embedding using a convolution network, identifying a plurality of latent codes respectively corresponding to the plurality of feature vectors by identifying a closest latent code from a codebook to each of the feature vectors, identifying a prominent code among the latent codes, and selecting the utterance as a summary utterance based on the prominent code.

Some examples of the method, apparatus, non-transitory computer readable medium, and system described above further include receiving audio information. Some examples further include converting the audio information to produce the text. In some examples, the audio information is received in a streaming format, and the utterance is selected as the summary utterance in real time.

Some examples of the method, apparatus, non-transitory computer readable medium, and system described above further include receiving video information. Some examples further include identifying the audio information from the video information. Some examples of the method, apparatus, non-transitory computer readable medium, and system described above further include identifying a plurality of summary utterances for the text. Some examples further include generating a summary for the text based on the plurality of summary utterances.

Some examples of the method, apparatus, non-transitory computer readable medium, and system described above further include appending a sentence tag to the utterance, wherein the semantic embedding of the utterance corresponds to an output of the embedding network corresponding to the sentence tag. In some examples, a number of the latent codes is equal to a number of dimensions of the semantic embedding and a number of dimensions of the latent codes is equal to a number of filters of the convolution network.

Some examples of the method, apparatus, non-transitory computer readable medium, and system described above further include computing a Euclidean distance between each of the feature vectors and each latent code from the codebook, wherein the closet latent code is identified based on the Euclidean distance. Some examples of the method, apparatus, non-transitory computer readable medium, and system described above further include identifying a plurality of text segments in the text.

Some examples further include identifying a frequency for each latent code from the codebook in each of the text segments. Some examples further include identifying a set of prominent codes based on the frequency, wherein the prominent code is an element of the set of prominent codes. Some examples of the method, apparatus, non-transitory computer readable medium, and system described above further include identifying a most frequent code from each of the text segments, wherein the set of prominent codes includes the most frequent code from each of the text segments.

Figure 5:
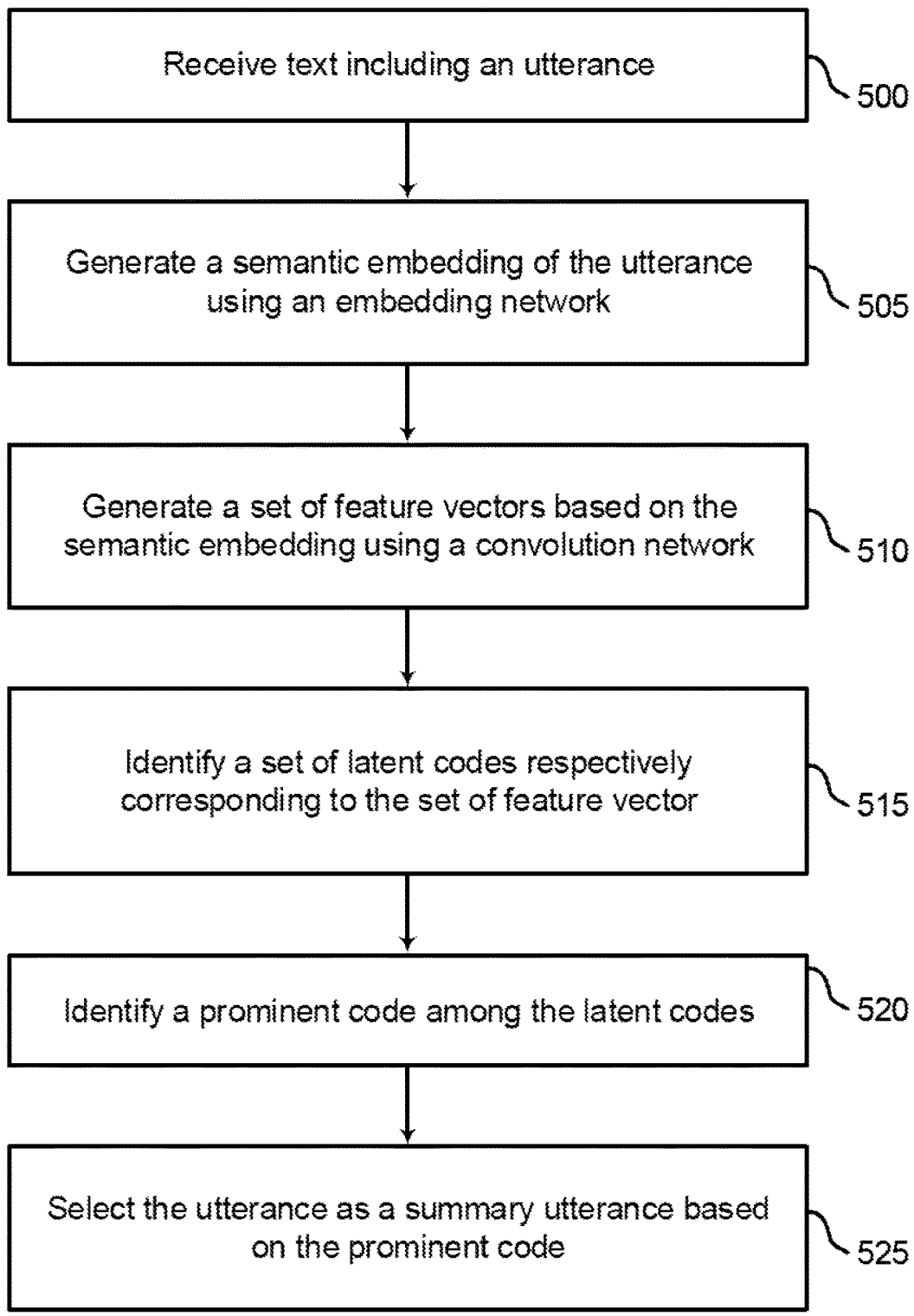
FIGS. 5 through 6 show examples of a process for text summarization according to aspects of the present disclosure.

FIG. 5 shows an example of a process for text summarization according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 500, the system receives text including an utterance. The utterance may be any natural language phrase. In some cases, the operations of this step refer to, or may be performed by, a user interface as described with reference to FIG. 1.

At operation 505, the system generates a semantic embedding of the utterance using an embedding network. A semantic embedding (i.e., word embedding) is a learned representation for text where words that have the same meaning have a similar representation. For example, a text input may be provided to a GloVe or Word2vec mode to generate a vector output as described with reference to embedding network 320 in FIG. 3 In some cases, the operations of this step may be performed by an embedding network 400 as described with reference to FIG. 4.

One or more embodiments of the present disclosure employ an embedding function $Embed_\theta(\cdot)$ to map an input utterance x into a semantically meaningful vector space. In some cases, the semantic embedding may be generated using an embedding function. The space is subsequently discretized according to a codebook by prefixing the input utterance x with a [CLS] token and a [SEP] token. Furthermore, the utterance is passed to a bidirectional encoder and transformer based machine learning model for NLP (e.g., a BERT model), and the vector corresponding to [CLS] is obtained as a pooled representation of the utterance, denoted by $h \in \mathbb{R}^H$.

At operation 510, the system generates a set of feature vectors based on the semantic embedding using a convolution network. For example, a $ConvEncoder_\varphi(\cdot)$ is used with a set of D filters to convolve the input h. The output is a sequence of feature vectors 710 $[q_1, \ldots, q_H]$ where $q_i \in \mathbb{R}^D$. The feature vectors are numeric values of individual measurable properties and are an output of a convolution encoder. In some cases, the operations of this step refer to, or may be performed by, a convolution network as described with reference to FIGS. 3 and 4.

At operation 515, the system identifies a set of latent codes respectively corresponding to the set of feature vectors by identifying a closest latent code from a codebook to each of the feature vectors. In some cases, the operations of this step refer to, or may be performed by, an encoding component 330 as described with reference to FIG. 3 or encoding component 410 of FIG. 4.

In some embodiments, latent codes are used to define a codebook. Each feature vector is assigned to a latent code in the codebook whose embedding has the minimum Euclidean distance with the code. The method discretizes the H-dimensional semantic space by producing latent codes for each dimension of the semantic space. The input utterance can be reconstructed with the latent code embeddings. Summary utterances are defined as associated with prominent latent codes.

Formally, a codebook $E=[e_1, \ldots, e_K]$ of latent codes may be defined, where K is the number of latent codes and $e_k \in \mathbb{R}^D$ is the k-th code embedding. The i-th feature $q_i$ is assigned to the latent code $z_i$ whose embedding $e_{z_i}$ has the minimum Euclidean distance with the code. In some embodiments, the system discretizes the H-dimensional semantic space by producing latent codes $\{z_i\}_{i=1}^H$, one for each dimension of the semantic space.

$$h = Embed_\theta(x) \in \mathbb{R}^H \qquad (1)$$

$$[q_1, \ldots, q_H] = ConvEncoder_\varphi(h), q_i \in \mathbb{R}^D \qquad (2)$$

$$z_i = argmax_k - \|q_i - e_k\|_2, i \in [H] \qquad (3)$$

At operation 520, the system identifies a prominent code among the latent codes. In some cases, the operations of this step refer to, or may be performed by, a summary component 335 as described with reference to FIG. 3 or summary component 415 of FIG. 4.

For example, summary utterances may be defined as associated with prominent latent codes or topics. Given a set of N utterances, latent codes are obtained from the n-th utterance denoted by $$\{z_i^{(n)}\}_{i=1}^H$$

which includes a total of N×H codes, providing prominent codes. The prominent codes are denoted by $\mathcal{P}$, which includes a set of frequently occurring codes. A score $S(x_n)$ is assigned to utterance $x_n$ that computes the frequency of association with prominent codes $\mathcal{P}$. $\Sigma_{i=1}^H \mathbb{1}[z_i^{(n)}=k]$ indicates the number of times the n-th utterance is assigned to code k, where k belongs to $\mathcal{P}$. Finally, K highest-scoring utterances are extracted to form an extractive summary of the input.

$$S(x_n) = \Sigma_{k \in \mathcal{P}} \Sigma_{i=1}^H \mathbb{1}[z_i^{(n)}=k] \qquad (7)$$

At operation 525, the system selects the utterance as a summary utterance based on the prominent code. In some cases, the operations of this step refer to, or may be performed by, a summary component as described with reference to FIGS. 3 and 4.

Training

A method, apparatus, non-transitory computer readable medium, and system for text summarization are described. One or more embodiments of the method, apparatus, non-transitory computer readable medium, and system include receiving a training set including an input utterance, generating a semantic embedding of the input utterance using an embedding network, generating a plurality of feature vectors based on the semantic embedding using a convolution network, identifying a plurality of latent codes respectively corresponding to the plurality of feature vectors by identifying a closest latent code from a codebook to each of the feature vectors, generating an output embedding based on the plurality of latent codes using a convolutional decoder, generating an output text based on the output embedding, computing an autoencoder loss by comparing the input utterance and the output text, and training convolution network based on the autoencoder loss.

Some examples of the method, apparatus, non-transitory computer readable medium, and system described above further include computing a codebook loss by comparing each of the plurality of feature vectors with a corresponding latent code from the plurality of latent codes, wherein the training is further based on the codebook loss. In some examples, the codebook loss is based on a stop-gradient operator on the each of the plurality of feature vectors, the corresponding latent code, or both.

Some examples of the method, apparatus, non-transitory computer readable medium, and system described above further include updating the codebook during the training. Some examples of the method, apparatus, non-transitory computer readable medium, and system described above further includes training an embedding network based on the autoencoder loss.

Figure 6:
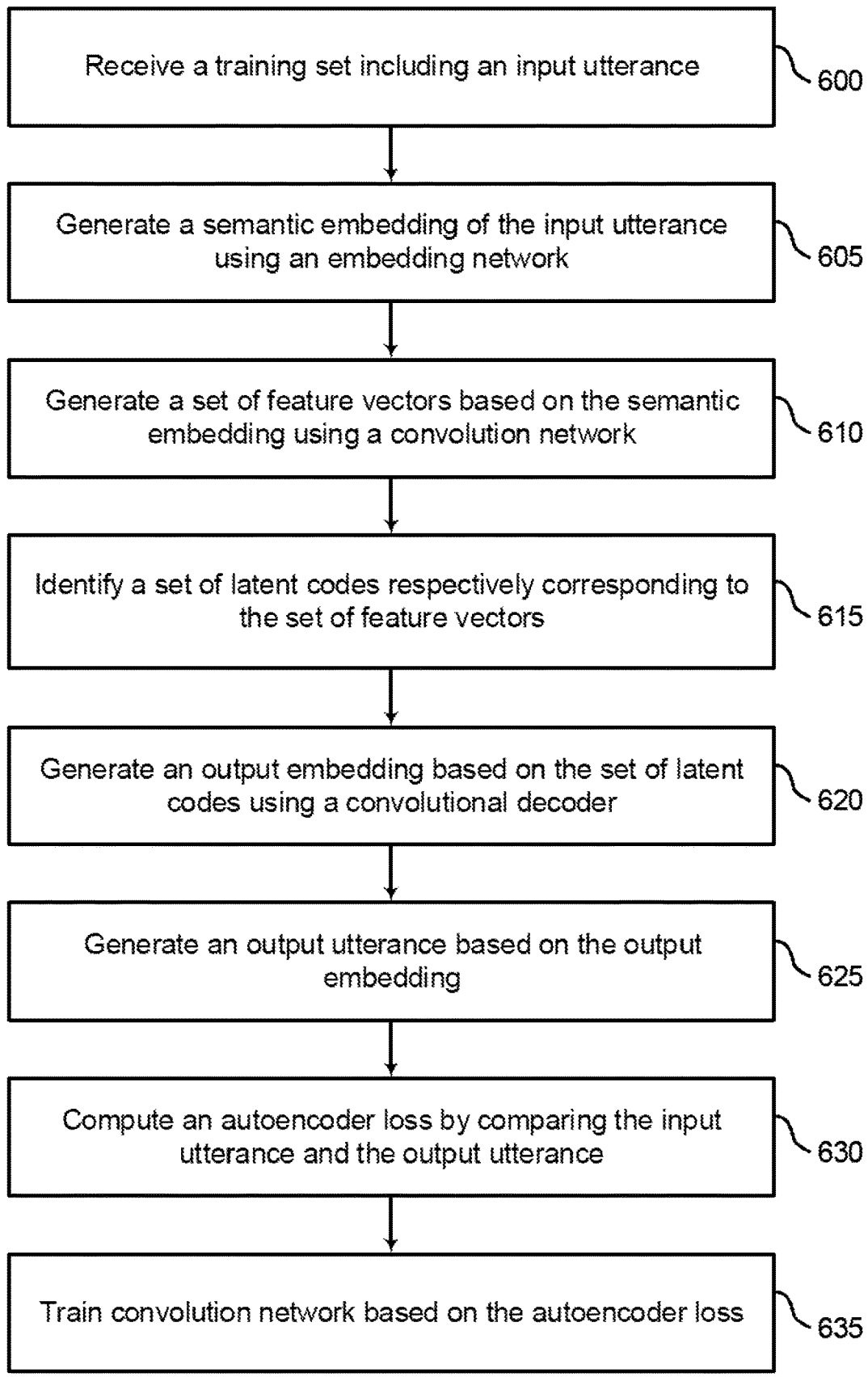

FIG. 6 shows an example of a process for text summarization according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 600, the system receives a training set including an input utterance. A training set is a dataset used to train a neural network. In some cases, the training set may be one or more natural language utterances. In some cases, the operations of this step refer to, or may be performed by, an audio converter as described with reference to FIG. 3.

At operation 605, the system generates a semantic embedding of the input utterance using an embedding network. A semantic embedding (i.e., word embedding) is a learned representation for text where words that have the same meaning have a similar representation. In some cases, the operations of this step refer to, or may be performed by, an embedding network as described with reference to FIGS. 3 and 4 according to the method described in step 505 of FIG. 5.

At operation 610, the system generates a set of feature vectors based on the semantic embedding using a convolution network. The feature vectors are numeric values of individual measurable properties and are an output of a convolution encoder. In some cases, the operations of this step refer to, or may be performed by, a convolution network as described with reference to FIGS. 3 and 4 according to the method described in step 510 of FIG. 5.

At operation 615, the system identifies a set of latent codes respectively corresponding to the set of feature vectors by identifying a closest latent code from a codebook to each of the feature vectors. The codebook may discretize a semantically meaningful space to map an input utterance using an embedding function. Codebook embeddings are used as text summarization model parameters. In some cases, a codebook may be a collection of codes used by the summarization system. In some cases, the operations of this step refer to, or may be performed by, an encoding component as described with reference to FIGS. 3 and 4 according to the method described in step 515 of FIG. 5.

At operation 620, the system generates an output embedding based on the set of latent codes using a convolutional decoder. A convolutional decoder may reconstruct an original sequence that was input to the convolutional encoder by utilizing knowledge of a code used by the encoder at the transmitter. In some cases, the operations of this step refer to, or may be performed by, a convolution network as described with reference to FIGS. 3 and 4.

At operation 625, the system generates an output text based on the output embedding. The output text may be an output summary of a video. In some cases, the operations of this step refer to, or may be performed by, an encoding component as described with reference to FIGS. 3 and 4.

For example, in a variational auto-encoder model, the input utterance is reconstructed with the latent code embeddings $[e_{z_1}, \ldots, e_{z_H}]$, which may be achieved by generating a dense vector $\tilde{h}$ using a ConvDecoder$_\varphi(\bullet)$ (e.g., the inverse of the convolution network). $\tilde{h}$ is then fed to a transformer decoder to reconstruct the original utterance $\tilde{x}$. The code embeddings serve as topic vectors that group dimensions of the semantic space into clusters relevant to the application domain. The text summarization model of the present disclosure parameters can include those used by the BERT encoder and transformer decoder ($\theta$ and $\phi$), the convolutional encoder and decoder whose parameters are tied ($\varphi$), and embeddings of the codebook E.

$$\tilde{h} = \text{ConvDecoder}_\varphi([e_{z_1}, \ldots, e_{z_H}]) \in \mathbb{R}^H \quad (4)$$

$$\tilde{x} = \text{Generate}_\phi(\tilde{h}) \quad (5)$$

At operation 630, the system computes an autoencoder loss by comparing the input utterance and the output text. An autoencoder loss refers to the cross-entropy loss between the original and reconstructed utterance that optimizes the BERT embedder. In some cases, the operations of this step refer to, or may be performed by, an encoding component as described with reference to FIGS. 3 and 4.

In one example, the loss function of the text summarization model used to learn the parameters comprises three parts, including a cross-entropy loss between the original and reconstructed utterance XEnt(x, $\tilde{x}$) that optimizes the BERT embedder $\theta$, Transformer generator $\phi$, and convolutional encoder and decoder $\varphi$. The gradients bypass the latent code embeddings due to the straight-through estimator. A dictionary learning algorithm is used to learn code embeddings in an end-to-end manner.

The algorithm moves code embeddings $e_{z_i}$ towards feature vectors 710 $q_i$ by minimizing the $l_2$-distance between the two vectors $\|e_{z_i} - sg(q_i)\|_2^2$, where sg($\bullet$) is a stop-gradient operator that constrains the operand to be a non-updated constant during backpropagation, i.e., stops $q_i$ from being updated. A commitment loss encourages the feature vector $q_i$ to commit to a code embedding. $\|sg(e_{z_i}) - q_i\|_2^2$ prevents high deviation of $q_i$ from the code embedding $e_{z_i}$.

The loss term is associated with a coefficient $\beta \in [0, 1]$.

$$\mathcal{L}(\theta) = \text{XEnt}(x,\tilde{x}) + \Sigma_i \|e_{z_i} - sg(q_i)\|_2^2 + \beta \Sigma_i \|sg(e_{z_i}) - q_i\|_2^2 \quad (6)$$

At operation 635, the system trains convolution network based on the autoencoder loss. In some cases, the operations of this step refer to, or may be performed by, a training component as described with reference to FIG. 3.

Figure 7:
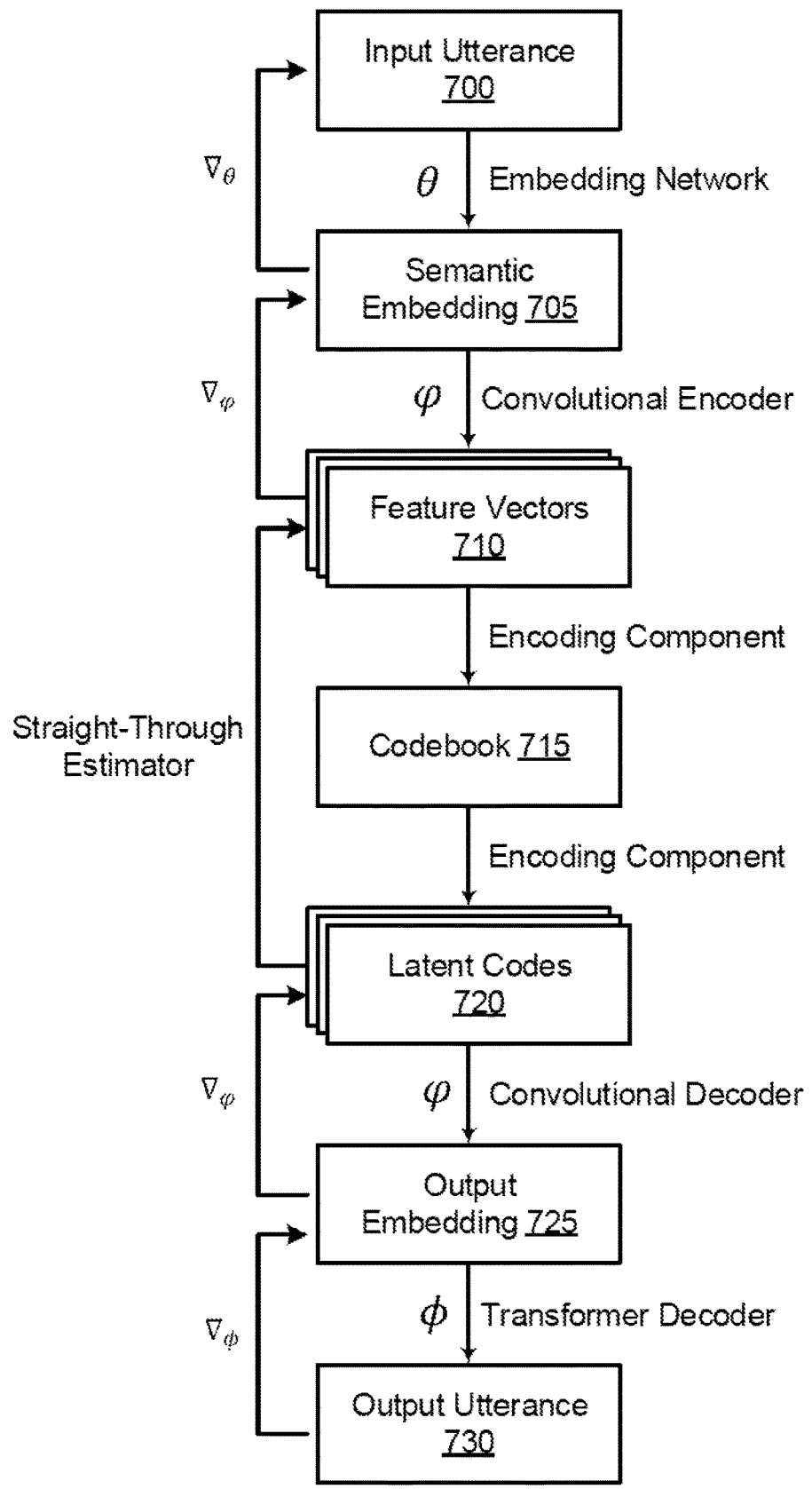
FIG. 7 shows an example of a diagram of training a text summarization apparatus according to aspects of the present disclosure.

FIG. 7 shows an example of a diagram of training a text summarization apparatus according to aspects of the present disclosure. The example shown includes input utterance 700, semantic embedding 705, feature vectors 710, codebook 715, latent codes 720, output embedding 725, and output text 730.

Each input utterances 700 may be transformed into a semantic embedding 705 (e.g., using an embedding network as described in FIGS. 3 and 4 according to the method described in step 505 FIG. 5). Then, a convolutional encoder is used to generate feature vectors 710 (e.g., using a convolution network 325 as described in FIG. 3 or convolution network 405 as described in FIG. 4, using the method described in step 510 of FIG. 5.) The feature vectors may be used as input to an encoding component (e.g., encoding component 330 of FIG. 3 or encoding component 410 of FIG. 4) according to the method described in step 515 of FIG. 5.

In some embodiments, a learning algorithm is used to learn code embeddings in an end-to-end manner. The algorithm moves code embeddings towards feature vectors by minimizing the Euclidean distance between the two vectors using a stop-gradient operator that constrains the operand to be a non-updated constant during backpropagation. A commitment loss encourages the feature vector to commit to a code embedding.

Thus, in some examples, a convolutional encoder and decoder transforms a semantic space using, e.g., a BERT model to map each dimension to a latent code. Additionally, the method can augment the semantic space in BERT with visual representations derived from video frames, and model topic transitions between utterances to improve summarization of livestreams.

Output embedding 725 is obtained by reconstructing the text of the input utterance with the latent code embeddings using a convolutional decoder. The output embedding 725 is used by a transformer decoder to generate the output text. The output text 730 is the final phrase determined by the summarization system of the present disclosure. In some cases, the output text 730 may be used as training data for training the summarization system.

Evaluation

Embodiments of the present disclosure may be used to create a large and representative corpus including transcripts and summaries of streaming videos. For example, leading social media platform that features livestreams of new and creative work by artists and designers has been explored. The social media platform comprises more than 10 million users who watch the livestream creations of artists and designers. The data are extracted from the website, which includes a large number of streaming videos (i.e., more than 5000), the length of which ranges from minutes to several hours. The language of the streamers is unplanned, and the content focuses on selected areas of art and design where information is conveyed verbally.

In an example scenario, a total of 5398 streamed videos with a combined duration of 500 hours are obtained from the social media platform. The metadata of a video includes ID, duration, title, a short description and the transcript. Automatic transcription may be performed by a speech recognition software that makes videos accessible to a wide audience. Each transcript includes a set of segments, corresponding to approximately 30 seconds of audio. Each segment comprises a set of utterances. The offset of the segment indicates the number of minutes since the beginning of the recording.

A textual summary is generated to show the verbal content when a user hovers over the thumbnail or scrolls past a video. The summarization annotates salient content across the video in an equally detailed manner while avoiding bias that may be present in news outlets. For example, a video is segmented into 5-minute clips and each clip is annotated for summary-worthy content. A clip may include an average of 51 utterances and 460 words. 370 streamed videos are selected for summary annotation due to time and budget constraints. The corpus of the social media platform is compared with other datasets that includes transcripts and human-annotated extractive or abstractive summaries.

In an example scenario, language skills of 12 workers recruited from a freelancing platform are validated for summary annotation, where organizations can find freelance workers directly to ensure instructions are fully understood. Each freelance worker is assigned a task of writing a concise summary for a given clip (i.e., Task A) and identifying summary utterances (i.e., Task B) using the graphical user interface, which shows a clip of the streamed video alongside a synchronized display of the transcript. For example, guidelines suggest that a good summary of Task A should be at least 100 characters and that of Task B should be between 50 and 80 words (approximately 15% compression). A clip is annotated by a single worker owing to the expensive annotation process. The worker can also identify a clip to be an informal conversation, in which case the clip is not annotated for summaries.

In an example scenario, a human abstract includes 3 sentences (i.e., 36 words) and a human-selected extract includes 5.5 utterances (i.e., 80 words). Furthermore, summary utterances constitute 8.9% and 8.6% of the total utterances in terms of number and duration. Three workers are invited to annotate 8 hours each of video that includes 96 clips to study an inter-annotator agreement. The reliability of agreement used to identify summary utterances is 0.13 using 10-second intervals as measuring units. The score (0.1~0.3) is within range of annotating speech transcripts for extractive summaries. Annotators perceive the same region as salient but may disagree on utterances in the summary due to verbosity of spoken text.

In an example scenario, a summarization dataset may include 370 videos split into short clips of 5 minutes each. The annotators manually annotated 5421 clips (~451 hours) with extractive and abstractive summaries, 8.9% of the utterances are identified as summary worthy. 582 clips (~49 hours) that include informal conversation are removed. The dataset is divided into train, validation and test splits. For example, 3884 clips (320 videos/323 hours) are used for training, 728 clips (25 videos/61 hours) for validation, and 809 clips (25 videos/67 hours) are used for testing.

When a user hovers the mouse pointer over the timeline of a video, a summary preview is shown which keeps updating. The variational autoencoder-based model extracts salient utterances from individual clips, which encourages selected utterances to be evenly distributed across the stream. In some cases, neural text summarization may not effectively identify content. For example, extracting summary utterances may be difficult without a dependency on intentional lead bias in news writing, which comprises utterances that occur anywhere in a video clip that may be used for a summary.

An example embodiment is compared with advanced extractive and abstractive text summarizations. The abstractive text summarizations generate an abstract from the transcript of a clip without fine-tuning and may include neural text summarizations with increased performance that may be pre-trained on language modeling and summarization tasks. The unsupervised extractive text summarizations extract salient utterances from a clip. Graph-based models extract the sentences with high relevance based on eigenvector centrality. Some models which generate multi-document text summaries assign higher scores to sentences including frequently occurring content words. An unsupervised graph-based abstractive meeting summarization method is used for speech transcripts. The summarization method groups utterances into clusters using community detection, generates an abstractive sentence from each cluster through multi-sentence compression, and finally selects few elements from abstractive sentences under a budget constraint.

In an example scenario, an embodiment includes a pre-trained $BERT_{-BASE}$ used as the embedder $Embed_\theta(\cdot)$. The text summarization model of the present disclosure has 12 layers, 12 heads per layer and a hidden size (H) of 768. A 6-layer transformer decoder is used as the generator $Generate_\phi(\cdot)$ to reconstruct the original utterance. The text summarization model of the present disclosure has 8 heads per layer, a hidden size of 768, and randomly initialized parameters. The convolutional encoder and decoder use a kernel size of 3; the parameters are tied, denoted by $\varphi$. The embedder is divided into two groups $\varepsilon=\{\theta\}$ and $\mathcal{R}=\{\phi, \varphi\}$, then separate training schedules are applied since the embedder is pretrained and the remaining parameters are not. Two optimization techniques (e.g., Adam optimizers) are used to learn parameters:

$$lr_\varepsilon = \tilde{lr}_\varepsilon \cdot \min(\text{step}^{-0.5}, \text{step} \cdot \text{warmup}_{249}^{-1.5}), \quad (8)$$

$$\tilde{lr}_\mathcal{R} = \tilde{lr}_\mathcal{R} \cdot \min(\text{step}^{-0.5}, \text{step} \cdot \text{warmup}_\mathcal{R}^{-1.5}) \quad (9)$$

where the learning rate for the embedder $\tilde{lr}=7e^{-4}$ is smaller than that of the rest params $\tilde{lr}_\mathcal{R}=4e^{-2}$. The warmup period is longer (i.e., $\text{warmup}_\varepsilon=3000$ for the embedder and $\text{warmup}_\mathcal{R}=1500$ for the rest. The warmup period includes updating the pretrained embedder in a slower pace until other model parameters start to generate accurate gradients.

30 epochs are used for graphical processing units with gradient accumulation every ten steps. Different numbers of filters, D={64, 100, 128}, for the convolutional encoder and decoder. The number of latent codes are varied in K={512, 1024, 2048}. The coefficient β used for commitment loss is set to 0.25. The hyperparameters are tuned on the validation set. Utterances including more than 5 words are considered. The final training set includes 168111 utterances.

Embodiments of the present disclosure analyze the performance of extractive text summarizations on identifying ground-truth summary utterances and reporting relevant instances (e.g., using precision, recall and F1-measure scores). In some examples, the length of the output is varied to yield {3, 4, 5}-utterance summaries. The lead-N baseline selects the first N utterances of a clip which gives low scores because the data does not present strong relevance (e.g., lead bias is not strong as that of news articles). A variational autoencoder-based unsupervised model outperforms other summarization systems. The length of the variational autoencoder model is comparable to that of graph-based models using eigenvector centrality when measured by number of words. For example, the highest F1-score of 30.47% is achieved when the variational autoencoder model generates a 5-utterance summary for each 5-minute clip which amounts to rendering one utterance per one minute segment when a user scrolls past the video.

One or more embodiments of the present disclosure compare extractive and abstractive text summarizations and measure content overlap between system and reference summaries using a recall-oriented metrics set. Human abstracts may be used as references. Extractive text summarizations may produce utterance summaries and an extracting function includes ground-truth utterances. The extracting function places an upper bound on the performance of extractive text summarizations. The variational autoencoder-based model yields the highest scores on R-2 and R-L metrics.

The abstractive summaries produced by summarizers and graph-based models are compared. For example, summaries produced by neural text summarizations and graph-based models are fluent and lack specificity in the associated content. The summary segments selected by unsupervised graph-based summarization methods are on-topic but ungrammatical and difficult to interpret without context. By contrast, the variational autoencoder-based unsupervised model identifies on-topic, informative utterances related to digital painting. There is less repetition in transcripts and verbosity, which indicates that streamers use more words in spoken language.

One or more embodiments of the present disclosure learn prominent latent codes and the associated utterances. Representative utterances refers to the utterances that may be frequently assigned to the latent codes. In an example, code C1 represents a skewed number of utterances commonly seen in the data not representative of the input and C2 represents lengthy though not necessarily summary worthy utterances. C1 or C2 is excluded before performing grid search on codes to find the set of prominent codes, for example, P=50 is tuned on the valid set which may be effective in identifying summary utterances.

Human evaluation compares the variational autoencoder model to extractive and abstractive advanced systems. In some examples, each evaluator is shown a video clip with a synchronized display of the transcript followed by four system summaries, shown in random order to remove any positional bias. The evaluator is asked to select the best and worst of the summaries according to fluency, informativeness and overall quality. Fluency or coherence refers to the presentation, grammatical correctness and ease of reading of a summary. The summary includes useful information about the video clip (i.e., informativeness) and should be of acceptable quality considering both content and linguistic aspects (i.e., overall quality).

In an example embodiment, 100 clips are randomly sampled from the test set. Each clip and the summaries are judged by five evaluators, recruited from a crowdsourcing website. The performance of systems is computed as the percentage of the difference of times the system was selected as the best and worst (i.e., best-worst scaling). The range of scores is [−1,1]. The variational autoencoder-based unsupervised model achieves the highest overall score of 0.52 and is selected as the best summary in more than 50% of the cases.

In the behance dataset, a total of 5398 streamed videos are collected from a social media platform. Some streamers do not continue the transcription services included by speech recognition software. Therefore, transcripts are not available for such videos. A list of domain keywords is created by finding 50 frequently appearing words from video titles. The keywords are used to select videos for human annotation. 2360 videos with transcripts available and includes at least one of the domain keywords in the video titles. The videos are split into clips of 5-minutes each. Some clips include little or no verbal content. Clips that include very few words (less than or equal to 333) or utterances (less than or equal to 38) are removed. The thresholds are determined using average values of the clips. Videos with less than 5 valid clips are removed from consideration. The preprocessing step gives 6003 clips from 381 videos of which 582 clips include informal conversation (i.e., uninformative chitchats), 11 videos that exclusively include informal conversation are removed from the dataset, yielding 5421 clips from 370 videos split into train, validation and test sets.

The variational autoencoder-based unsupervised model is compared against neural abstractive advanced systems using pretrained models to perform natural language processing tasks (i.e., following the HuggingFace implementation). Utterances longer than 5 words are concatenated into a flat sequence which may be used as the input to each summarizer. In some examples, the model parameters include the maximum and minimum summary lengths taken as 150 and 15 tokens, respectively. A beam size of 5 is used with early stopping. The length penalty is 1.0 and a trigram cannot occur more than once in the summary (i.e., no_repeat_n-gram_size is set to 3).

The text summarization model is compared with neural extractive advanced systems. They are implemented using an automatic text summarization apparatus where default text parser and stemmer are adopted. The unsupervised text summarization for speech transcript summarization uses the summarization method scores. For example, the number of components used in summarization techniques for long text (e.g., latent semantic analysis (LSA) based summarization) is 25. The number of utterance communities is 35. The number of clusters is 6, with a scaling factor of 1.3 and lambda of 0.4. The summary size is 50 words.

One or more embodiments of the present disclosure show prominent latent codes, the associated utterances and example summaries generated by different summarizers. Representative utterances (e.g., five utterances) are chosen for each code that may be frequently assigned to the code. C1 utterances are frequently seen in the data (chitchats) and not representative of the input. C2 is associated with lengthy and few summary-worthy utterances. C3 utterances are comprehensive and include diverse information. C1 or C2 is excluded before performing grid search on codes to find the set of prominent codes which includes identification of summary utterances without biasing towards the lengthy ones.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described systems and methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
receiving text including an utterance;
generating a semantic embedding of the utterance using an embedding network;
generating a plurality of feature vectors based on the semantic embedding using a convolution network;
identifying a first plurality of latent codes respectively corresponding to the plurality of feature vectors by identifying a closest latent code from a second plurality of latent codes of a codebook to each corresponding feature vector of the plurality of feature vectors, wherein the second plurality of latent codes of the codebook discretizes a semantic space based on a number of dimensions of the semantic space, and wherein the closest latent code is identified by computing a similarity between the closest latent code and the corresponding feature vector;
identifying a prominent code among the first plurality of latent codes; and
generating an indication that the utterance is a summary utterance based on the prominent code.

2. The method of claim 1, further comprising:
receiving audio information; and
converting the audio information to produce the text.

3. The method of claim 2, wherein:
the audio information is received in a streaming format, and the utterance is selected as the summary utterance in real time.

4. The method of claim 2, further comprising:
receiving video information; and
identifying the audio information from the video information.

5. The method of claim 1, further comprising:
identifying a plurality of summary utterances for the text; and
generating a summary for the text based on the plurality of summary utterances.

6. The method of claim 1, further comprising:
appending a sentence tag to the utterance, wherein the semantic embedding of the utterance corresponds to an output of the embedding network corresponding to the sentence tag.

7. The method of claim 1, wherein:
a number of the latent codes in the second plurality of latent codes of the codebook is equal to a number of dimensions of the semantic embedding.

8. The method of claim 1, wherein:
a number of dimensions of the first plurality of latent codes is equal to a number of filters of the convolution network.

9. The method of claim 1, further comprising:
computing a Euclidean distance between each of the feature vectors and each of the second plurality of latent codes from the codebook, wherein the closest latent code is identified based on the Euclidean distance.

10. The method of claim 1, further comprising:
identifying a plurality of text segments in the text;
identifying a frequency for each latent code of the second plurality of latent codes from the codebook in each of the text segments; and
identifying a set of prominent codes based on the frequency, wherein the prominent code is an element of the set of prominent codes.

11. The method of claim 10, further comprising:
identifying a most frequent code from each of the text segments, wherein the set of prominent codes includes the most frequent code from each of the text segments.

12. The method of claim 10, further comprising:
identifying a set of segment codes associated with a text segment associated with a predetermined location within the text; and
refraining from including the set of segment codes in the set of prominent codes based on the association with the text segment, wherein the set of prominent codes includes the prominent code.

13. An apparatus comprising:
an embedding network configured to generate a semantic embedding of an utterance;
a convolution network generates a plurality of feature vectors based on the semantic embedding; and
an encoding component configured to identify a plurality of first latent codes respectively corresponding to the plurality of feature vectors by identifying a closest latent code from a second plurality of latent codes of a codebook to each corresponding feature vector of the plurality of feature vectors, wherein the second plurality of latent codes discretizes a semantic space based on a number of dimensions of the semantic space, and wherein the closest latent code is identified by computing a similarity between the closest latent code and the corresponding feature vector; and a summary component configured to identify a prominent code among the first plurality of latent codes and to select the utterance as a summary utterance based on the prominent code.

14. The apparatus of claim 13, further comprising:
an audio converter configured to receive audio information and convert the audio information to text, wherein the utterance is identified from the text.

15. The apparatus of claim 13, further comprising:
a user interface configured to display the summary utterance.

16. The apparatus of claim 13, wherein:
the summary component is further configured to generate a summary for a text based on the summary utterance.

17. A method of training a neural network, the method comprising:
receiving a training set including an input utterance;
generating a semantic embedding of the input utterance using an embedding network;
generating a plurality of feature vectors based on the semantic embedding using a convolution network;
identifying a first plurality of latent codes respectively corresponding to the plurality of feature vectors by identifying a closest latent code from a second plurality of latent codes of a codebook to each corresponding feature vector of the plurality of feature vectors, wherein the second plurality of latent codes discretizes a semantic space based on a number of dimensions of the semantic space, and wherein the closest latent code is identified by computing a similarity between the closest latent code and the corresponding feature vector;
generating an output embedding based on the first plurality of latent codes using a convolutional decoder;
generating an output text based on the output embedding;
computing an autoencoder loss by comparing the input utterance and the output text; and
updating parameters of the convolution network based on the autoencoder loss.

18. The method of claim 17, further comprising:
computing a codebook loss by comparing each of the plurality of feature vectors with a corresponding latent code from the first plurality of latent codes, wherein the parameters are updated based on the codebook loss.

19. The method of claim 18, wherein:
the codebook loss is based on a stop-gradient operator on the each of the plurality of feature vectors, a corresponding latent code from the plurality of latent codes, or both.

20. The method of claim 17, further comprising:
updating the codebook based on the autoencoder loss.

* * * * *